United States Patent
Yamaguchi

(10) Patent No.: US 11,366,474 B1
(45) Date of Patent: Jun. 21, 2022

(54) VESSEL STEERING SYSTEM AND VESSEL STEERING METHOD

(71) Applicant: YAMAHA HATSUDOKI KABUSHIKI KAISHA, Iwata (JP)

(72) Inventor: Kohei Yamaguchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 347 days.

(21) Appl. No.: 16/827,837

(22) Filed: Mar. 24, 2020

Related U.S. Application Data

(60) Provisional application No. 62/823,104, filed on Mar. 25, 2019.

(51) Int. Cl.
*G05D 1/02* (2020.01)
*B63H 25/02* (2006.01)

(52) U.S. Cl.
CPC .......... *G05D 1/0206* (2013.01); *B63H 25/02* (2013.01); *B63H 2025/026* (2013.01)

(58) Field of Classification Search
CPC . G05D 1/0206; B63H 25/02; B63H 2025/026
See application file for complete search history.

(56) References Cited

U.S. PATENT DOCUMENTS

| | | | |
|---|---|---|---|
| 8,589,004 B1 | 11/2013 | Kanno | |
| 2010/0138083 A1* | 6/2010 | Kaji | B63H 25/02 701/21 |
| 2011/0153125 A1* | 6/2011 | Arbuckle | B63B 39/00 701/21 |
| 2011/0153126 A1* | 6/2011 | Arbuckle | B63H 21/22 701/21 |
| 2011/0166724 A1* | 7/2011 | Hiramatsu | B63H 25/42 702/85 |
| 2012/0276793 A1* | 11/2012 | Minoura | B63H 11/107 440/43 |
| 2014/0046515 A1* | 2/2014 | Mizutani | B63H 21/21 701/21 |
| 2015/0166159 A1* | 6/2015 | Inoue | B63H 20/12 440/53 |

FOREIGN PATENT DOCUMENTS

JP  2014-073700 A  4/2014

* cited by examiner

*Primary Examiner* — Richard M Camby
(74) *Attorney, Agent, or Firm* — Keating and Bennett, LLP

(57) ABSTRACT

A zone in which a vessel is movable is expanded in a transverse moving mode using a joystick. When a tilt direction of a joystick is within a second range closer to a back-and-forth direction than a first range, a controller sets a steering angle of a right propulsion device and a left propulsion device such that the right and left propulsion devices are oriented bilaterally opposite to each other such that each is slanted at a predetermined angle with respect to the back-and-forth direction. The controller sets both the right and left propulsion devices to either a forward moving state or a rearward moving state. The controller controls a propulsive force of the right propulsion device and the left propulsion device such that a net force of the propulsive forces of the right and left propulsion devices is oriented in a direction corresponding to the tilt direction of the joystick.

12 Claims, 18 Drawing Sheets

VESSEL STEERING SYSTEM AND VESSEL STEERING METHOD

CROSS REFERENCE TO RELATED APPLICATIONS

This application claims the benefit of priority to U.S. Patent Application No. 62/823,104 filed on Mar. 25, 2019. The entire contents of this application are hereby incorporated herein by reference.

BACKGROUND OF THE INVENTION

1. Field of the Invention

The present invention relates to a vessel steering system and a vessel steering method.

2. Description of the Related Art

There has been conventionally known a vessel steering system for steering front, rear, right and left movements of a vessel by a joystick. For example, Japanese Laid-open Patent Publication No. 2014-73700 describes a vessel including a right outboard motor and a left outboard motor. When the joystick is tilted in a transverse direction, a controller of the vessel controls the right and left outboard motors in a transverse moving mode. In the transverse moving mode, the controller sets a steering angle of the right outboard motor and that of the left outboard motor such that the right and left outboard motors are oriented bilaterally opposite to each other such that each is slanted at a predetermined angle with respect to a back-and-forth direction of the vessel. Additionally, the controller sets one of a propulsive force of the right outboard motor and that of the left outboard motor to act in a forward moving direction, while setting the other to act in a rearward moving direction. With this setting, a net force of the propulsive forces of the right and left outboard motors acts in the transverse direction of the vessel, whereby the vessel is moved in the transverse direction.

When the joystick is tilted in the transverse direction and the back-and-forth direction, the controller similarly controls the right and left outboard motors in the transverse moving mode. In other words, the controller sets the steering angles and the directions of propulsive forces of the right and left outboard motors as described above. Additionally, the controller controls the propulsive forces of the right and left outboard motors such that the net force of the propulsive forces of the right and left outboard motors is oriented in a direction corresponding to a tilt direction of the joystick. Accordingly, the vessel is moved in the direction corresponding to the tilt direction of the joystick.

In the transverse moving mode, the steering angles of the right and left outboard motors are fixedly set such that the right and left outboard motors are oriented such that each is slanted at a predetermined angle with respect to the back-and-forth direction of the vessel. Because of this, as shown in FIG. 18, the above-described vessel steering system cannot move the vessel to a zone Z1 closer to the front direction than a steering angle direction X1 of one outboard motor or a zone Z2 closer to the rear direction than a steering angle direction X2 of the other outboard motor.

SUMMARY OF THE INVENTION

Preferred embodiments of the present invention provide an expanded zone in which vessels are each movable in a transverse moving mode using a joystick.

A system according to a preferred embodiment of the present invention relates to a system for steering a vessel. The system includes a left propulsion device, a left actuator, a right propulsion device, a right actuator, a joystick, and a controller. The left actuator is connected to the left propulsion device to change a steering angle of the left propulsion device. The right actuator is connected to the right propulsion device to change a steering angle of the right propulsion device. The joystick is operable in a tiltable manner. The controller receives a signal indicating a tilt direction of the joystick. The controller controls the steering angle and a propulsive force of the left propulsion device and the steering angle and a propulsive force of the right propulsion device.

When the tilt direction of the joystick is within a first range including a straight transverse direction, the controller controls the right and left propulsion devices as follows. The controller sets the steering angles of the right and left propulsion devices such that the right and left propulsion devices are oriented bilaterally opposite to each other such that each is slanted at a predetermined angle with respect to a back-and-forth direction of the vessel. The controller sets one of the right and left propulsion devices to a forward moving state and sets the other of the right and left propulsion devices to a rearward moving state. The controller controls the propulsive forces of the right and left propulsion devices such that a net force of the propulsive forces of the right and left propulsion devices is oriented in a direction corresponding to the tilt direction of the joystick.

When the tilt direction of the joystick is within a second range closer to the back-and-forth direction than the first range, the controller controls the right and left propulsion devices as follows. The controller sets the steering angles of the right and left propulsion devices such that the right and left propulsion devices are oriented bilaterally opposite to each other such that each is slanted at the predetermined angle with respect to the back-and-forth direction. The controller sets both the right and left propulsion devices to either the forward moving state or the rearward moving state. The controller controls the propulsive forces of the right and left propulsion devices such that the net force of the propulsive forces of the right and left propulsion devices is oriented in the direction corresponding to the tilt direction of the joystick.

A method according to another preferred embodiment of the present invention relates to a method executed by a controller in order to operate a vessel. The vessel includes a right propulsion device and a left propulsion device. The method includes a series of processes as follows. A first process relates to receiving a signal indicating a tilt direction of a joystick to steer the vessel.

A second process relates to controlling the right and left propulsion devices as follows when the tilt direction of the joystick is within a first range including a straight transverse direction. A steering angle of the right propulsion device and a steering angle of the left propulsion device are set such that the right and left propulsion devices are oriented bilaterally opposite to each other such that each is slanted at a predetermined angle with respect to a back-and-forth direction of the vessel. One of the right and left propulsion devices is set to a forward moving state, and the other of the right and left propulsion devices is set to a rearward moving state. A propulsive force of the right propulsion device and a propulsive force of the left propulsion device are controlled such that a net force of the propulsive forces of the right and left propulsion devices is oriented in a direction corresponding to the tilt direction of the joystick.

A third process relates to controlling the right and left propulsion devices as follows when the tilt direction of the joystick is within a second range closer to the back-and-forth direction than the first range. The steering angles of the right and left propulsion devices are set such that the right and left propulsion devices are oriented bilaterally opposite to each other such that each is slanted at the predetermined angle with respect to the back-and-forth direction. Both the right and left propulsion devices are set to either the forward moving state or the rearward moving state. The propulsive forces of the right and left propulsion devices are controlled such that the net force of the propulsive forces of the right and left propulsion devices is oriented in the direction corresponding to the tilt direction of the joystick.

According to preferred embodiments of the present invention, a zone to which a vessel is movable is expanded in a transverse moving mode using a joystick.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
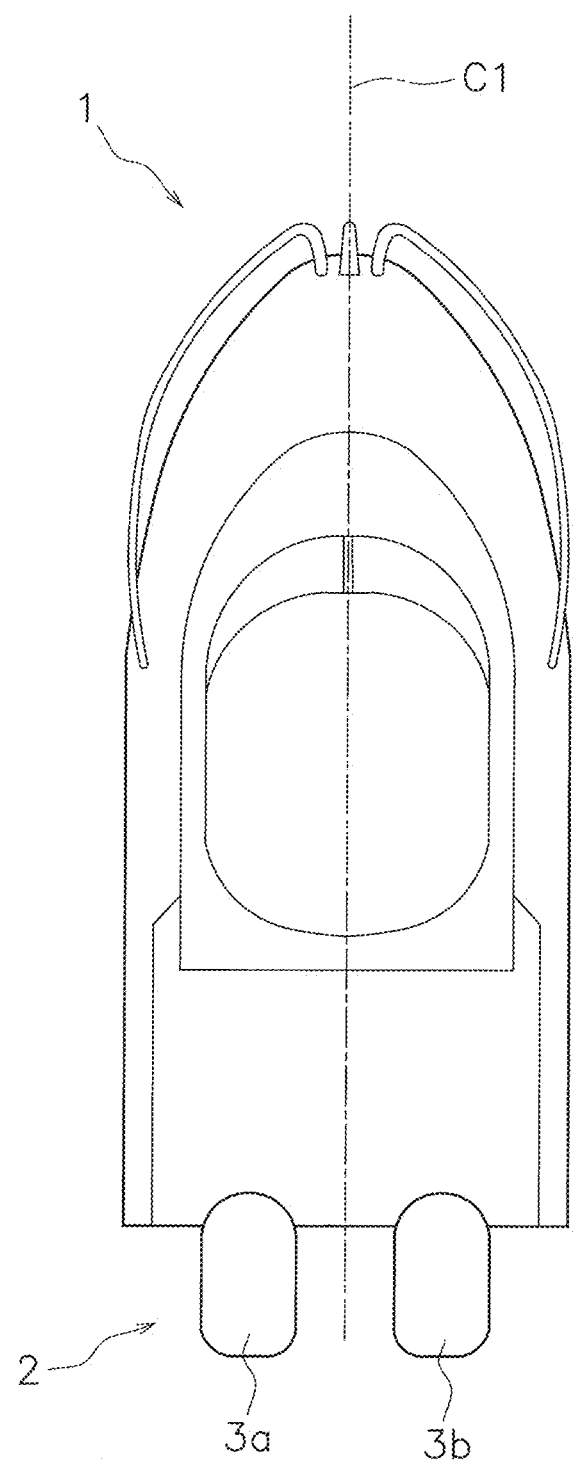
FIG. 1 is a top view of a vessel according to a preferred embodiment of the present invention.

Preferred embodiments of the present invention will be hereinafter explained with reference to the attached drawings. FIG. 1 is a top view of a vessel 1 according to a preferred embodiment of the present invention. A vessel steering system 2 according to a preferred embodiment of the present invention is installed in the vessel 1. As shown in FIG. 1, the vessel steering system 2 includes a plurality of propulsion devices 3a and 3b. The propulsion devices 3a and 3b are outboard motors, for example. Specifically, the vessel 1 includes a left propulsion device 3a and a right propulsion device 3b. It should be noted that in the following explanation, front, rear, right, left, up, and down directions are defined as meaning the front, rear, right, left, up, and down directions of the vessel 1, respectively.

The left and right propulsion devices 3a and 3b are attached to the stern of the vessel 1. The left and right propulsion devices 3a and 3b are disposed in alignment in the width direction of the vessel 1. Specifically, the left propulsion device 3a is disposed on the left side of a center line Cl extending in the back-and-forth direction of the vessel 1. The right propulsion device 3b is disposed on the right side of the center line Cl. Each propulsion device 3a and 3b generates a propulsive force to propel the vessel 1.

Figure 2:
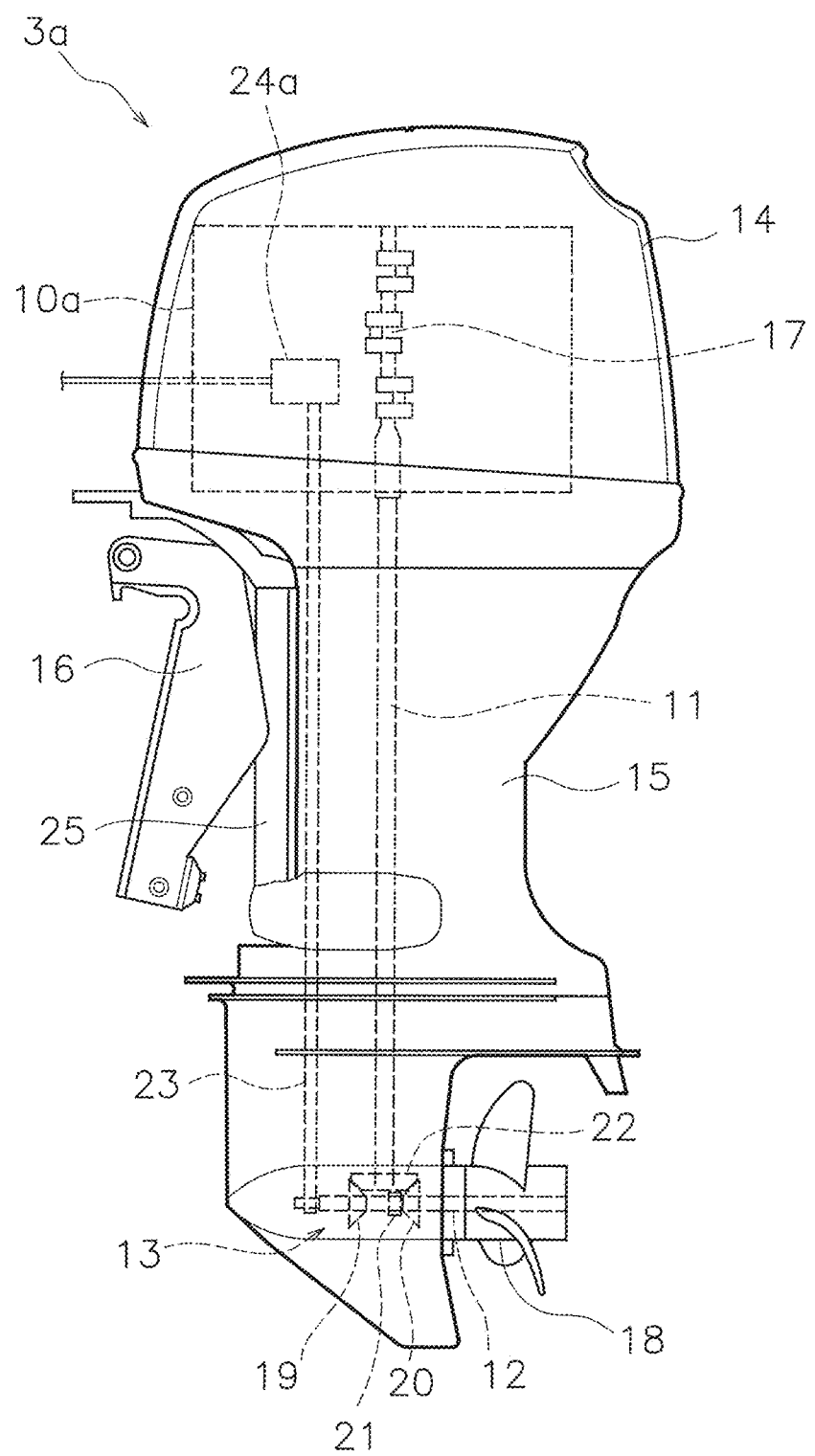
FIG. 2 is a side view of a left propulsion device.

FIG. 2 is a side view of the left propulsion device 3a. The left propulsion device 3a includes an engine 10a, a driveshaft 11, a propeller shaft 12, a shift mechanism 13, an engine cowl 14, a housing 15, and a bracket 16.

The engine 10a generates the propulsive force to propel the vessel 1. The engine 10a is disposed inside the engine cowl 14. The engine 10a includes a crankshaft 17. The crankshaft 17 extends in a vertical direction. The driveshaft 11 is connected to the crankshaft 17. The driveshaft 11 extends downward from the engine 10a. The propeller shaft 12 extends in a direction intersecting with the driveshaft 11. The propeller shaft 12 extends in the back-and-forth direction. The propeller shaft 12 is connected to the driveshaft 11 through the shift mechanism 13. A propeller 18 is connected to the propeller shaft 12.

The housing 15 is disposed directly below the engine cowl 14. The driveshaft 11, the propeller shaft 12, and the shift mechanism 13 are disposed inside the housing 15. The shift mechanism 13 switches the rotational direction of power to be transmitted from the driveshaft 11 to the propeller shaft 12. The shift mechanism 13 includes a forward moving gear 19, a rearward moving gear 20, and a clutch 21. The forward moving gear 19 and the rearward moving gear 20 are meshed with a bevel gear 22. The bevel gear 22 is attached to the driveshaft 11. The clutch 21 selectively causes either the forward moving gear 19 or the rearward moving gear 20 to be engaged with the propeller shaft 12. The clutch 21 is movable to a forward moving position, a rearward moving position, and a neutral position.

When set in the forward moving position, the clutch 21 causes the forward moving gear 19 to be engaged with the propeller shaft 12. Accordingly, the rotation of the driveshaft 11 is transmitted to the propeller shaft 12 so as to rotate the propeller shaft 12 in a forward moving direction. When set in the rearward moving position, the clutch 21 causes the rearward moving gear 20 to be engaged with the propeller shaft 12. Accordingly, the rotation of the driveshaft 11 is transmitted to the propeller shaft 12 so as to rotate the propeller shaft 12 in a rearward moving direction. When set in the neutral position, the clutch 21 causes both the forward moving gear 19 and the rearward moving gear 20 to be disengaged from the propeller shaft 12. Therefore, the rotation of the driveshaft 11 is not transmitted to the propeller shaft 12.

The left propulsion device 3a includes a shift member 23 and a shift actuator 24a. The shift member 23 is connected to the shift mechanism 13. The shift member 23 actuates the shift mechanism 13. More specifically, the shift member 23 is connected to the clutch 21. When driven by the shift actuator 24a, the shift member 23 moves the clutch 21 to one of the forward moving position, the rearward moving position, and the neutral position. The shift actuator 24a is connected to the shift member 23. The shift actuator 24a drives the shift member 23. The shift actuator 24a is, for instance, an electric motor. The shift actuator 24a drives the shift member 23 so as to switch the clutch 21 to one of the forward moving position, the rearward moving position, and the neutral position.

The bracket 16 attaches the left propulsion device 3a to the vessel 1. The left propulsion device 3a is detachably fixed to the stern of the vessel 1 through the bracket 16. The bracket 16 includes a steering shaft 25. The left propulsion device 3a is supported by the bracket 16 while being rotatable about the steering shaft 25.

Figure 3:
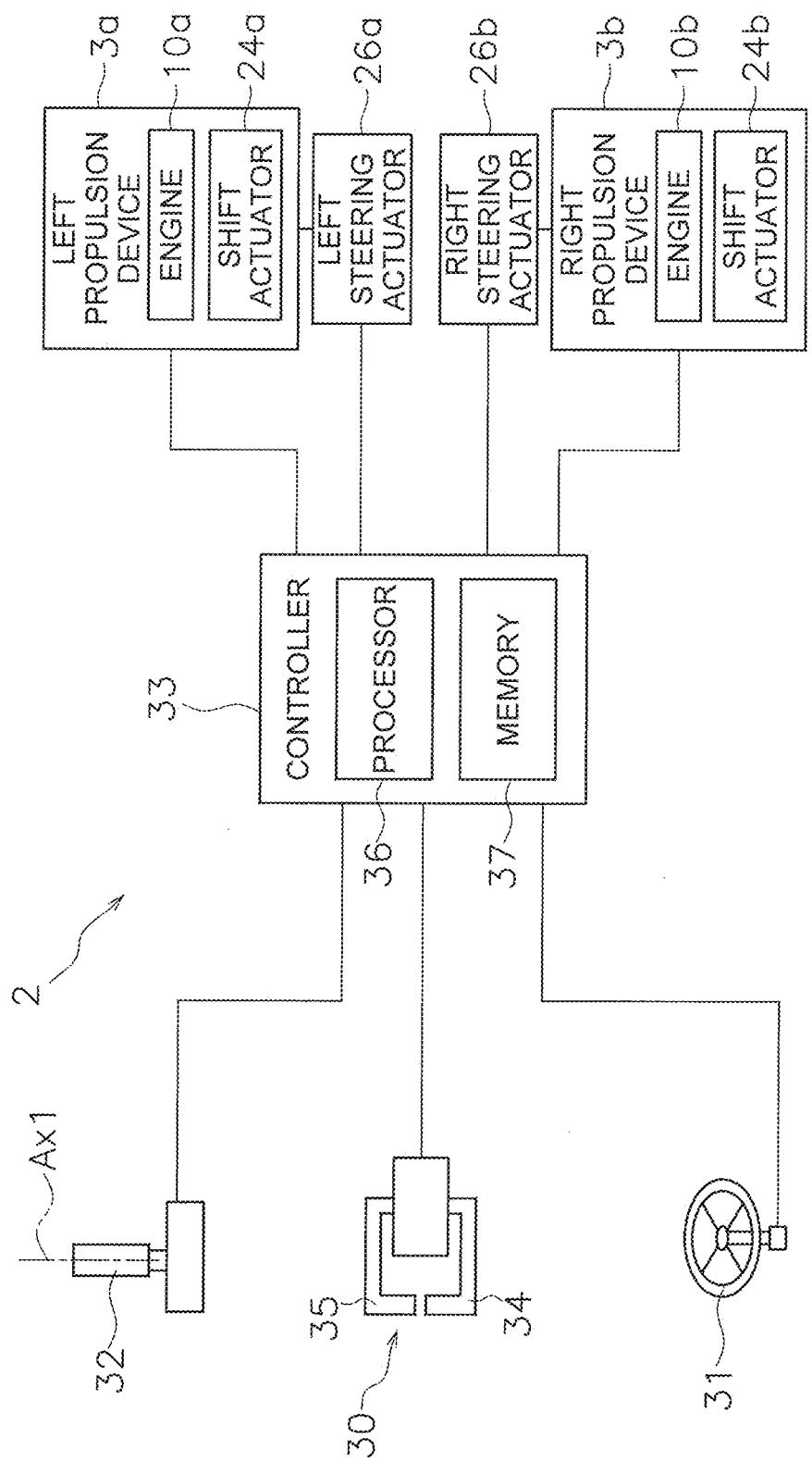
FIG. 3 is a schematic diagram showing a configuration of a vessel steering system according to a preferred embodiment of the present invention.

FIG. 3 is a schematic diagram showing a configuration of the vessel steering system 2. As shown in FIG. 3, the vessel steering system 2 includes a left steering actuator 26a. The left steering actuator 26a is connected to the left propulsion device 3a. The left steering actuator 26a rotates the left propulsion device 3a about the steering shaft 25. Thus, the left steering actuator 26a changes the steering angle of the left propulsion device 3a. The left steering actuator 26a includes, for instance, a hydraulic cylinder. Alternatively, the left steering actuator 26a may include an electric cylinder or an electric motor.

The right propulsion device 3b has a similar configuration to the left propulsion device 3a. For example, as shown in FIG. 3, the right propulsion device 3b includes an engine 10b and a shift actuator 24b. The engine 10b and the shift actuator 24b in the right propulsion device 3b have similar configurations to the engine 10a and the shift actuator 24a in the left propulsion device 3a, respectively.

The vessel steering system 2 includes a right steering actuator 26b. The right steering actuator 26b is connected to the right propulsion device 3b. The right steering actuator 26b rotates the right propulsion device 3b about a steering shaft of the right propulsion device 3b. Thus, the right steering actuator 26b changes the steering angle of the right propulsion device 3b. The right steering actuator 26b includes, for instance, a hydraulic cylinder. Alternatively, the right steering actuator 26b may include an electric cylinder or an electric motor.

As shown in FIG. 3, the vessel steering system 2 includes a remote control device 30, a steering device 31, a joystick 32, and a controller 33.

The remote control device 30 includes a first operating member 34 and a second operating member 35. The first operating member 34 is operated by a user to control the left propulsion device 3a. The first operating member 34 is, for instance, a lever. The first operating member 34 is operable to a forward moving position, a rearward moving position, and a neutral position. The remote control device 30 transmits a signal indicating an operation of the first operating member 34 to the controller 33.

The second operating member 35 is operated by the user to control the right propulsion device 3b. The second operating member 35 has a similar configuration to the first operating member 34. The remote control device 30 transmits the signal indicating an operation of the first operating member 34 to the controller 33. The remote control device 30 transmits a signal indicating an operation of the second operating member 35 to the controller 33.

The steering device 31 is, for instance, a steering wheel. The steering device 31 is operated by the user to control the steering angles of the left and right propulsion devices 3a and 3b. The steering device 31 is operable to a left turn position, a right turn position, and a neutral position. The steering device 31 transmits a signal indicating the position of the steering device 31 to the controller 33.

The joystick 32 is operable in a tiltable manner. The joystick 32 is operable in front, rear, right, and left directions and oblique directions therebetween. The joystick 32 is operable 360 degrees in all directions about a rotational axis Ax1 of the joystick 32. The joystick 32 transmits a signal indicating the position of the joystick 32 to the controller 33. The position of the joystick 32 indicates the tilt direction and the operating amount of the joystick 32. The operating amount of the joystick 32 is the tilt amount of the joystick 32.

The controller 33 includes a processor 36 and a memory 37. The memory 37 includes a volatile memory such as a RAM. The memory 37 includes a non-volatile memory such as a ROM. The controller 33 may include an auxiliary storage device such as an HDD or an SSD. The memory 37 stores programs and data to control the left and right propulsion devices 3a and 3b and the left and right steering actuators 26a and 26b. The processor 36 is a CPU (Central Processing Unit), for instance, and executes processes to control the left and right propulsion devices 3a and 3b and the left and right steering actuators 26a and 26b in accordance with the programs.

The controller 33 controls the left and right propulsion devices 3a and 3b and the left and right steering actuators 26a and 26b based on the signals transmitted thereto from the steering device 31, the remote control device 30, and the joystick 32. More specifically, the controller 33 controls the direction and the magnitude of the propulsive force of the left propulsion device 3a in accordance with the position of the first operating member 34. The controller 33 controls the shift actuator 24a in accordance with the position of the first operating member 34. Accordingly, the clutch 21 of the shift mechanism 13 is switched among the forward moving position, the rearward moving position, and the neutral position. As a result, the direction of the propulsive force of the left propulsion device 3a is switched among forward, rearward, and neutral. Moreover, the controller 33 controls the magnitude of the propulsive force of the left propulsion device 3a in accordance with the position of the first operating member 34. The controller 33 controls the magnitude of the propulsive force of the left propulsion device 3a by, for instance, controlling the throttle opening degree of the engine 10a.

The controller 33 controls the direction and the magnitude of the propulsive force of the right propulsion device 3b in accordance with the position of the second operating member 35. The controller 33 controls the shift actuator 24b in accordance with the position of the second operating member 35. Accordingly, similarly to the left propulsion device 3a, the direction of the propulsive force of the right propulsion device 3b is switched among forward, rearward, and neutral. Moreover, the controller 33 controls the magnitude of the propulsive force of the right propulsion device 3b in accordance with the position of the second operating member 35. The controller 33 controls the magnitude of the propulsive force of the right propulsion device 3b by, for instance, controlling the throttle opening degree of the engine 10b.

The controller 33 controls the left and right steering actuators 26a and 26b in accordance with the position of the steering device 31. Accordingly, the steering angles of the left and right propulsion devices 3a and 3b are controlled. As a result, the turn direction of the vessel 1 is controlled.

The controller 33 controls the left and right propulsion devices 3a and 3b and the left and right steering actuators 26a and 26b in accordance with the position of the joystick 32. More specifically, the controller 33 controls the propulsive forces and the steering angles of the left and right propulsion devices 3a and 3b such that the vessel 1 performs a translational motion in a direction corresponding to the tilt direction of the joystick 32. Controlling the vessel 1 by operating the joystick 32 will be hereinafter explained in detail.

Figure 4:
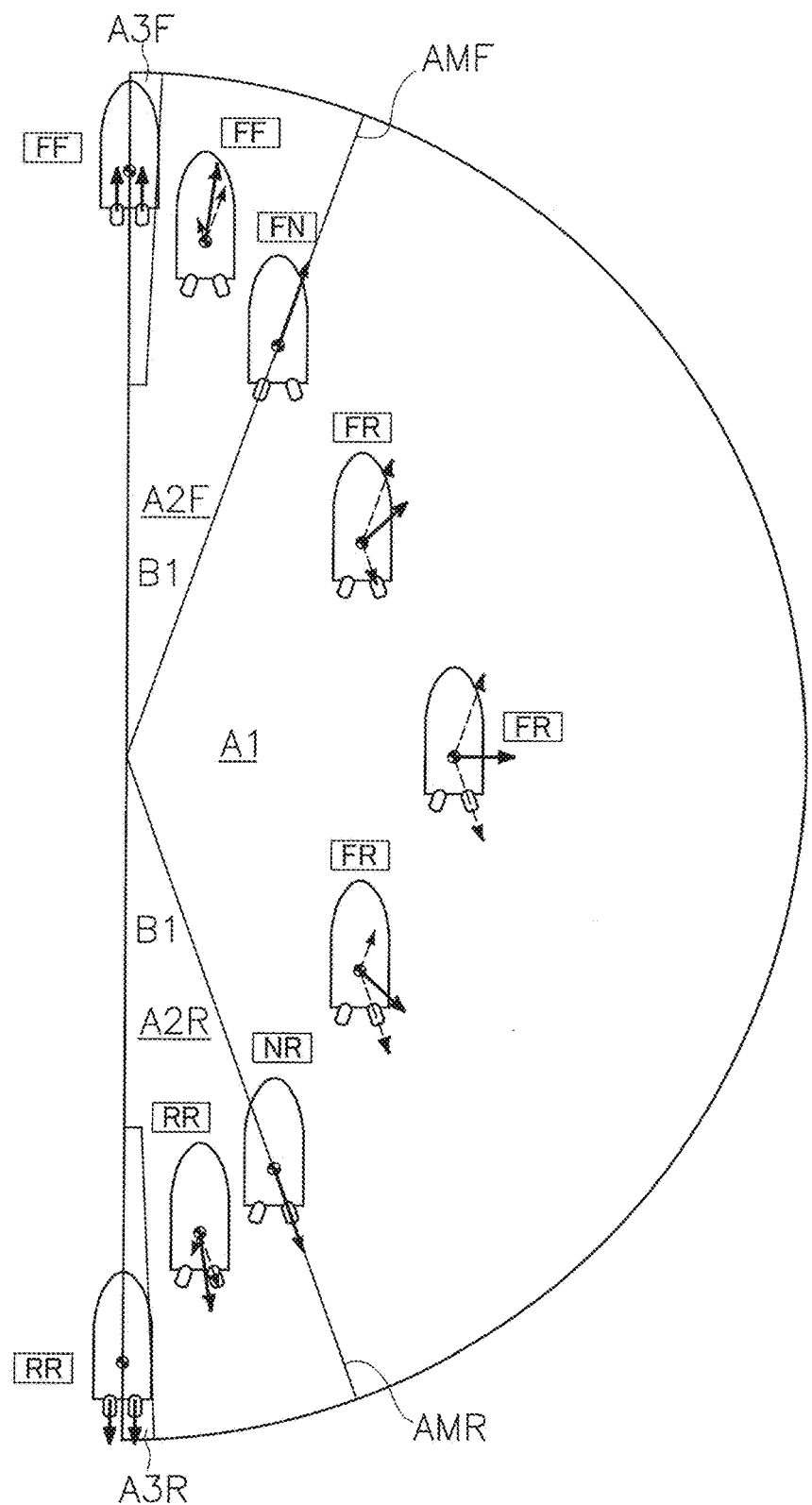
FIG. 4 is a diagram showing moving directions of the vessel and shift states of right and left propulsion devices in accordance with tilt directions of a joystick.

FIG. 4 is a diagram showing moving directions of the vessel 1 and shift states of the left and right propulsion devices 3a and 3b in accordance with tilt directions of the joystick 32. In FIG. 4, "F" means forward. "R" means rearward. "N" means neutral. FIG. 4 shows the shift states made by tilting the joystick 32 in front, rear, right, right front, right rear directions, respectively. It should be noted that the term "right front direction" encompasses, without being limited to a single direction, an arbitrary direction between the right direction and the front direction. The term "right rear direction" encompasses, without being limited to a single direction, an arbitrary direction between the right direction and the rear direction.

Tilt ranges of the joystick 32 include a first range A1, intermediate ranges AMF and AMR, second ranges A2F and A2R, and third ranges A3F and A3R. The first range A1 includes the right direction, the right front direction, and the right rear direction. The second range A2F includes the right front direction. The second range A2F is closer to the front direction than the first range A1. The second range A2R includes the right rear direction. The second range A2R is closer to the rear direction than the first range A1. The intermediate range AMF is a range between the first range A1 and the second range A2F. The intermediate range AMF is the steering angle direction of the left propulsion device 3a. The intermediate range AMR is a range between the first range A1 and the second range A2R. The intermediate range AMR is the steering angle direction of the right propulsion device 3b. The third range A3F includes the front direction. The third range A3R includes the rear direction.

When the tilt direction of the joystick 32 is within any of the first range A1, the intermediate ranges AMF and AMR, and the second ranges A2F and A2R, the controller 33 controls the left and right propulsion devices 3a and 3b and the left and right steering actuators 26a and 26b in a transverse moving mode. In the transverse moving mode, the controller 33 sets the steering angles of the left and right propulsion devices 3a and 3b such that the left and right propulsion devices 3a and 3b are oriented bilaterally opposite to each other such that each is slanted at a predetermined angle with respect to the back-and-forth direction. More specifically, as shown in FIG. 5, in the transverse moving mode, the controller 33 makes each of the left and right propulsion devices 3a and 3b tilt to a toe-in side at a predetermined angle B1 with respect to the back-and-forth direction.

The predetermined angle B1 is set such that a net force P of a propulsive force of the left propulsion device 3a and a propulsive force of the right propulsion device 3b acts at a center of gravity G1 of the vessel 1. The controller 33 controls the propulsive force PL of the left propulsion device 3a and the propulsive force PR of the right propulsion device 3b such that the net force P is oriented in a direction corresponding to the tilt direction of the joystick 32.

As shown in FIG. 4, when the tilt direction of the joystick 32 is within the first range A1, the controller 33 sets the left propulsion device 3a to a forward moving state and sets the right propulsion device 3b to a rearward moving state. Additionally, the controller 33 controls the propulsive force PL of the left propulsion device 3a and the propulsive force PR of the right propulsion device 3b such that the net force P of the propulsive force PL of the left propulsion device 3a and the propulsive force PR of the right propulsion device 3b is oriented in a direction corresponding to the tilt direction of the joystick 32.

Figure 5:
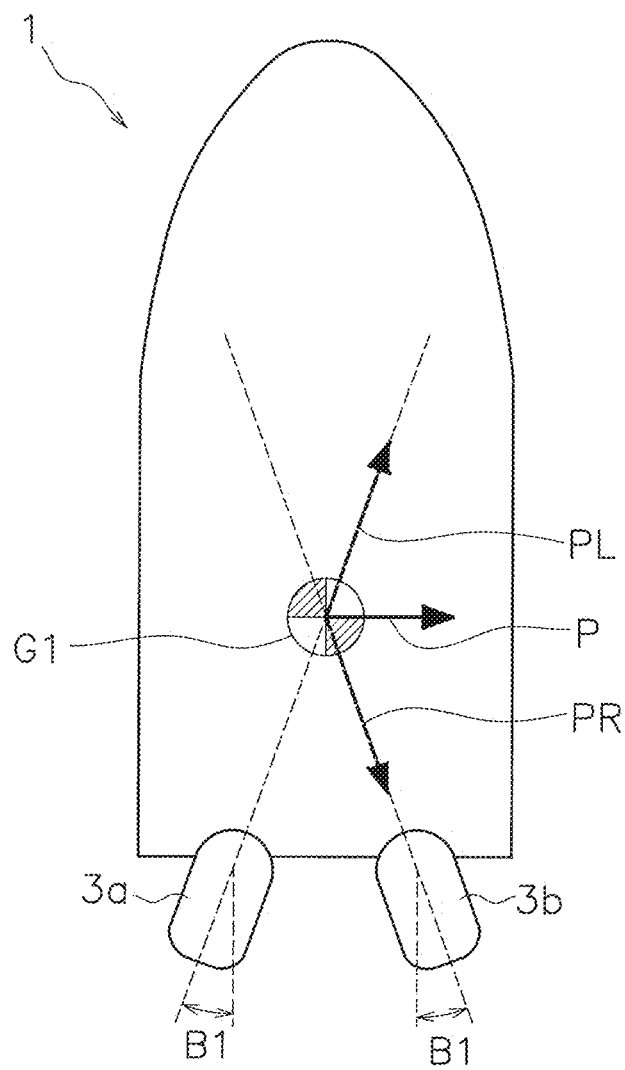
FIG. 5 is a diagram showing propulsive forces of the right and left propulsion devices and a net force thereof.
Figure 6:
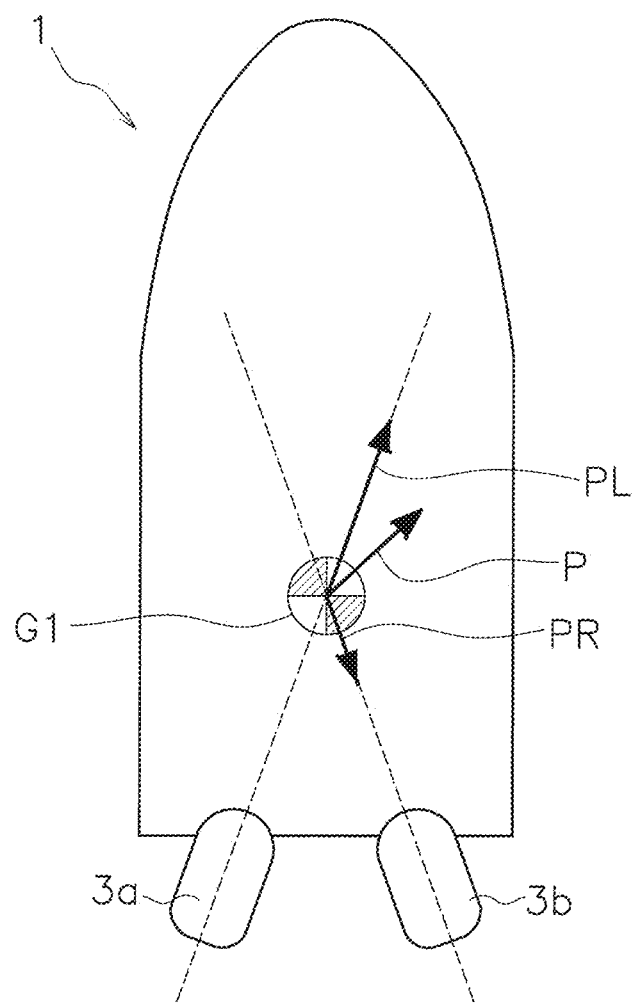
FIG. 6 is a diagram showing the propulsive forces of the right and left propulsion devices and the net force thereof.

For example, when the tilt direction of the joystick 32 is the right direction, as shown in FIG. 5, the controller 33 sets the magnitude of the propulsive force PL of the left propulsion device 3a and that of the propulsive force PR of the right propulsion device 3b to be equal. Accordingly, the net force P is oriented in the right direction. As a result, the vessel 1 is moved in the right direction. When the tilt direction of the joystick 32 is the right front direction within the first range A1, as shown in FIG. 6, the controller 33 sets the magnitude of the propulsive force PL of the left propulsion device 3a to be greater than that of the propulsive force PR of the right propulsion device 3b. Accordingly, the net force P is oriented in the right front direction. As a result, the vessel 1 is moved in the right front direction.

Figure 7:
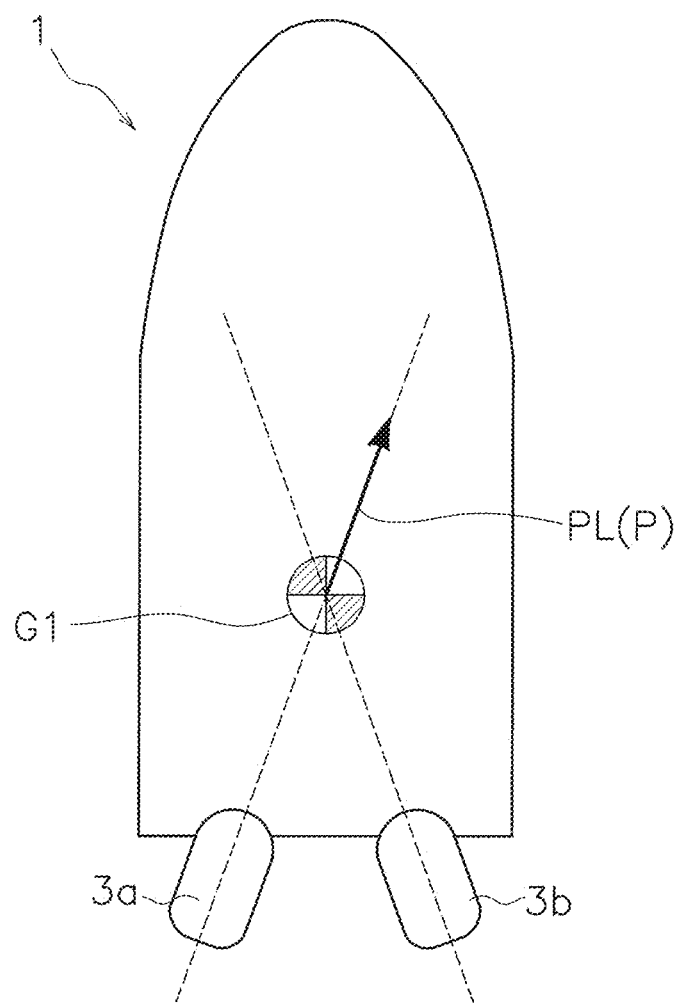
FIG. 7 is a diagram showing the propulsive forces of the right and left propulsion devices and the net force thereof.

When the tilt direction of the joystick 32 is within the intermediate range AMF, as shown in FIG. 4, the controller 33 sets the left propulsion device 3a to the forward moving state and sets the right propulsion device 3b to the neutral state. Accordingly, as shown in FIG. 7, the net force P is oriented in a direction matched with the orientation of the left propulsion device 3a to slant such that the steering angle thereof corresponds to the predetermined angle B1 (this direction will be hereinafter referred to as "steering angle direction"). It should be noted that the intermediate range AMF includes the steering angle direction of the left propulsion device 3a.

Figure 8:
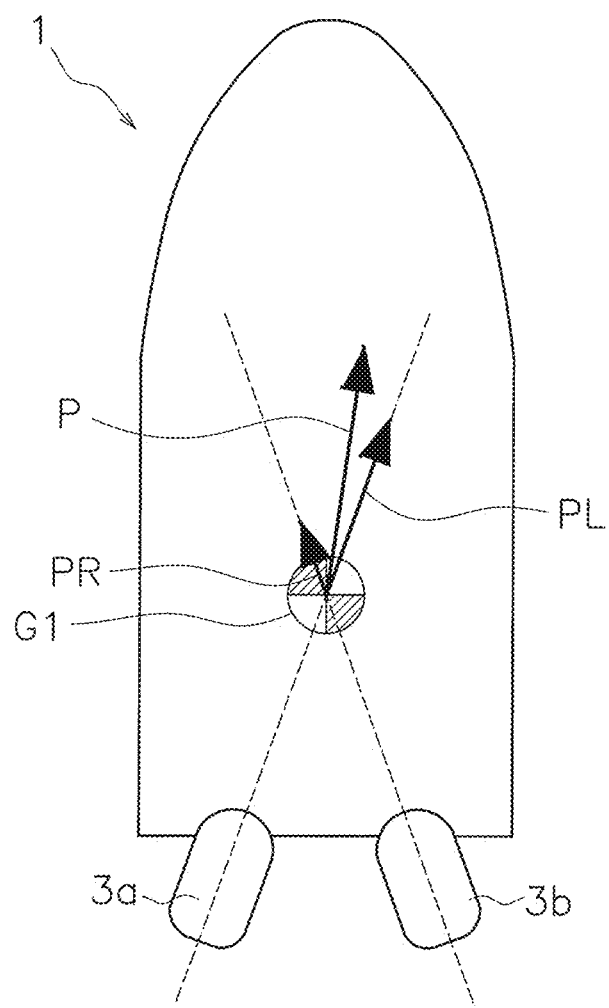
FIG. 8 is a diagram showing the propulsive forces of the right and left propulsion devices and the net force thereof.

As shown in FIG. 4, when the tilt direction of the joystick 32 is within the second range A2F, the controller 33 sets both the left and right propulsion devices 3a and 3b to the forward moving state. Additionally, as shown in FIG. 8, the controller 33 controls the propulsive force PL of the left propulsion device 3a and the propulsive force PR of the right propulsion device 3b such that the net force P is oriented in a direction corresponding to the tilt direction of the joystick 32. Moreover, the controller 33 sets the magnitude of the propulsive force PL of the left propulsion device 3a to be greater than that of the propulsive force PR of the right propulsion device 3b. Accordingly, the net force P is oriented in the right front direction. As a result, the vessel 1 is moved in the right front direction. The second range A2F includes a range closer to the front direction than the steering angle direction of the left (right) propulsion device 3a (3b). Therefore, the vessel 1 is moved in a direction closer to the front direction than the steering angle direction of the left (right) propulsion device 3a (3b).

Figure 9:
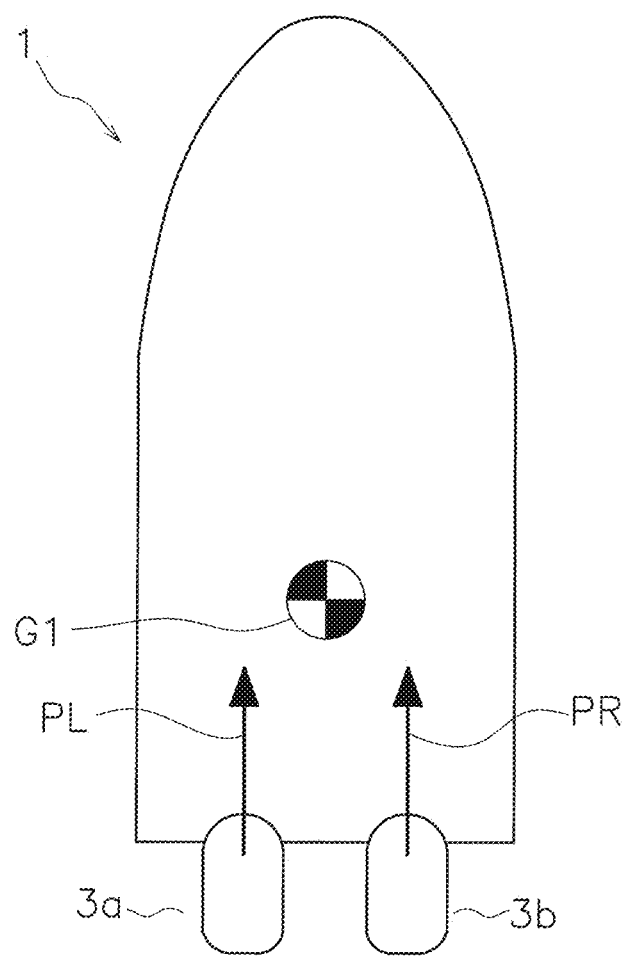
FIG. 9 is a diagram showing the propulsive forces of the right and left propulsion devices and the net force thereof.

When the tilt direction of the joystick 32 is within the third range A3F, the controller 33 controls the left and right propulsion devices 3a and 3b and the left and right steering actuators 26a and 26b in a back-and-forth moving mode. In the back-and-forth moving mode, as shown in FIG. 9, the controller 33 sets the steering angles of the left and right propulsion devices 3a and 3b such that the left and right propulsion devices 3a and 3b are oriented along the back-and-forth direction of the vessel 1. Additionally, the controller 33 sets both the left and right propulsion devices 3a and 3b to the forward moving state. Accordingly, the vessel 1 is moved in the forward direction.

Figure 10:
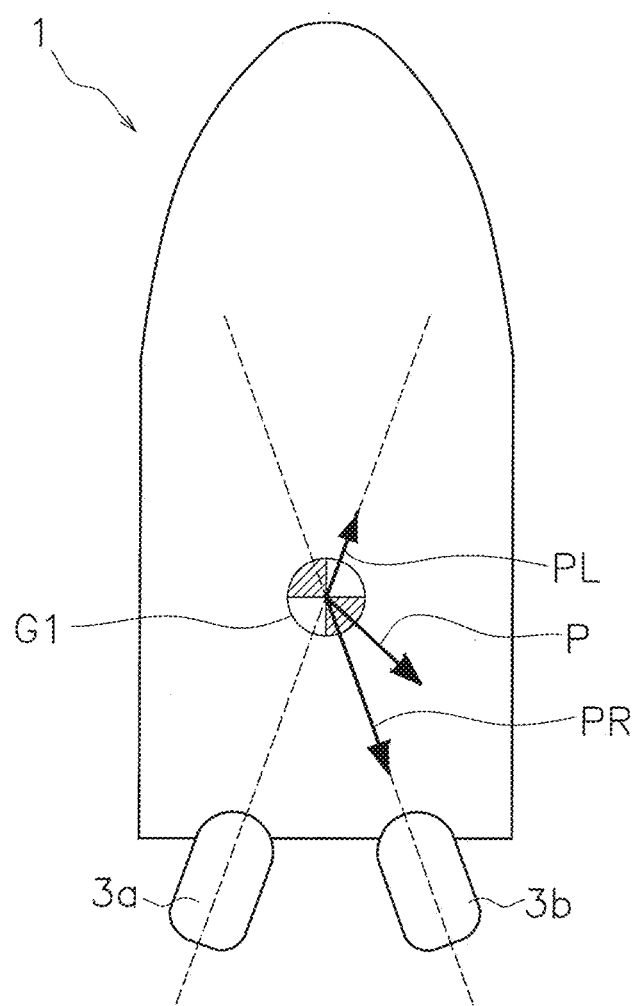
FIG. 10 is a diagram showing the propulsive forces of the right and left propulsion devices and the net force thereof.

When the tilt direction of the joystick 32 is the right rear direction within the first range A1, as shown in FIG. 10, the controller 33 sets the left propulsion device 3a to the forward moving state and sets the right propulsion device 3b to the rearward moving state. Moreover, the controller 33 sets the magnitude of the propulsive force PR of the right propulsion device 3b to be greater than that of the propulsive force PL of the left propulsion device 3a. Accordingly, the net force P is oriented in the right rear direction. As a result, the vessel 1 is moved in the right rear direction.

Figure 11:
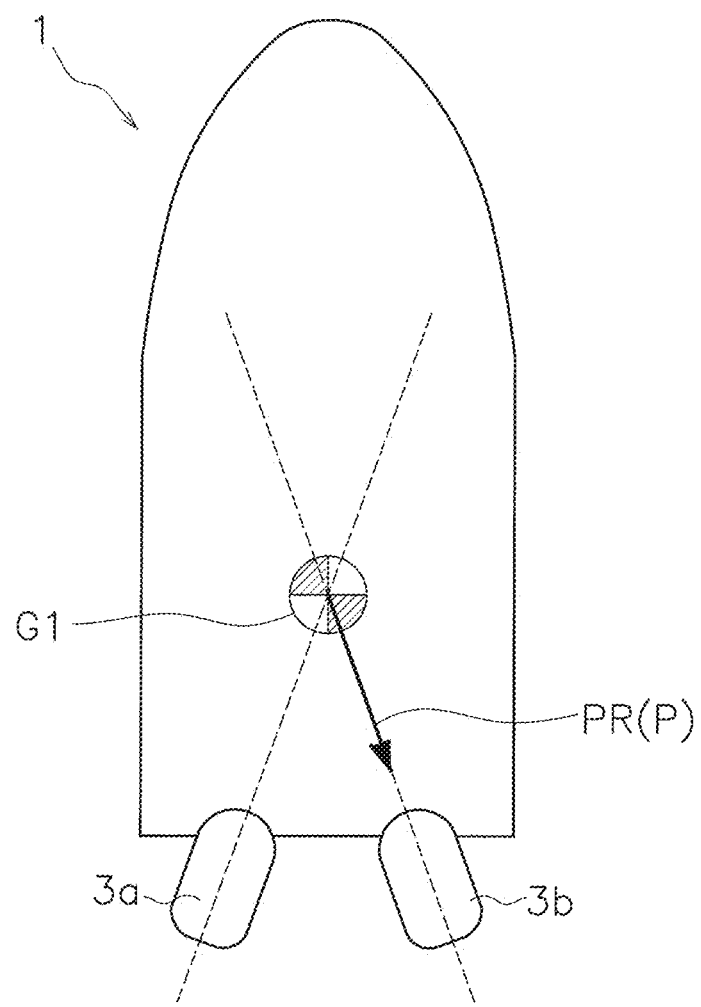
FIG. 11 is a diagram showing the propulsive forces of the right and left propulsion devices and the net force thereof.

When the tilt direction of the joystick 32 is within the intermediate range AMR, as shown in FIG. 4, the controller 33 sets the right propulsion device 3b to the rearward moving state and sets the left propulsion device 3a to the neutral state. Accordingly, as shown in FIG. 11, the net force P is oriented in the steering angle direction of the right propulsion device 3b.

Figure 12:
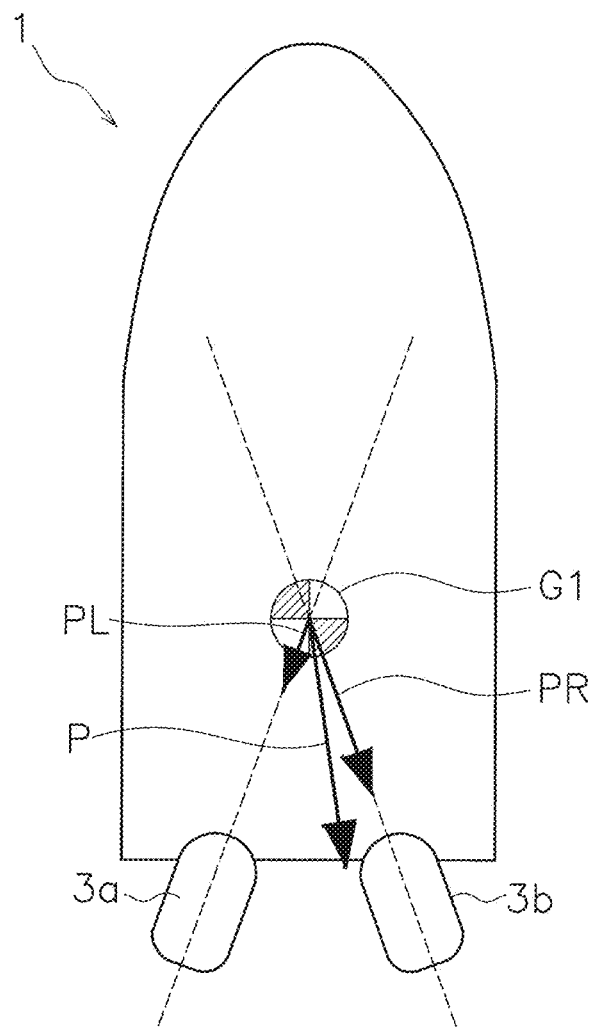
FIG. 12 is a diagram showing the propulsive forces of the right and left propulsion devices and the net force thereof.

As shown in FIG. 4, when the tilt direction of the joystick 32 is within the second range A2R, the controller 33 sets both the left and right propulsion devices 3a and 3b to the rearward moving state. Additionally, as shown in FIG. 12, the controller 33 controls the propulsive force PL of the left propulsion device 3a and the propulsive force PR of the right propulsion device 3b such that the net force P is oriented in a direction corresponding to the tilt direction of the joystick 32. The controller 33 sets the magnitude of the propulsive force PR of the right propulsion device 3b to be greater than that of the propulsive force PL of the left propulsion device 3a. Accordingly, the net force P is oriented in the right rear direction. As a result, the vessel 1 is moved in the right rear direction. The second range A2R includes a range closer to the rear direction than the steering angle direction of the right (left) propulsion device 3b (3a). Therefore, the vessel 1 is moved in a direction closer to the rear direction than the steering angle direction of the right (left) propulsion device 3b (3a).

Figure 13:
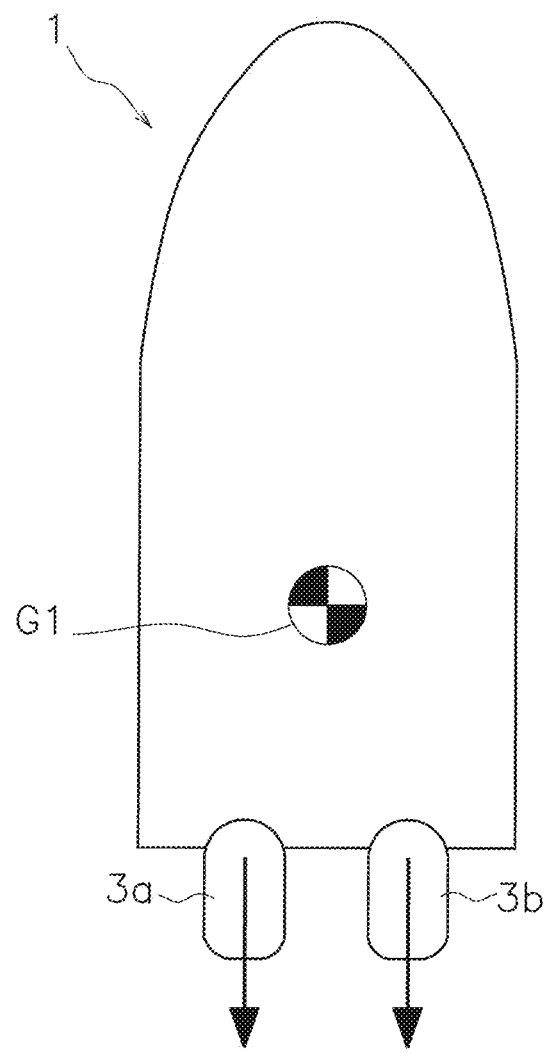
FIG. 13 is a diagram showing the propulsive forces of the right and left propulsion devices and the net force thereof.

When the tilt direction of the joystick 32 is within the third range A3R, the controller 33 controls the left and right propulsion devices 3a and 3b and the left and right steering actuators 26a and 26b in the back-and-forth moving mode. In the back-and-forth moving mode, as shown in FIG. 13, the controller 33 sets the steering angles of the left and right propulsion devices 3a and 3b such that the left and right propulsion devices 3a and 3b are oriented along the back-and-forth direction of the vessel 1. Additionally, the controller 33 sets both the left and right propulsion devices 3a and 3b to the rearward moving state. Accordingly, the vessel 1 is moved in the rear direction.

More specifically, when the tilt direction of the joystick 32 is within any of the third ranges A3F and A3R, and simultaneously, when the operating amount of the joystick 32 tilted in the back-and-forth direction is greater than a predetermined value, the controller 33 controls the left and right propulsion devices 3a and 3b and the left and right steering actuators 26a and 26b in the back-and-forth moving mode. When the operating amount of the joystick 32 tilted in the back-and-forth direction is less than or equal to the predetermined value, although the tilt direction of the joystick 32 is within any of the third ranges A3F and A3R, the controller 33 controls the left and right propulsion devices 3a and 3b and the left and right steering actuators 26a and 26b in the transverse moving mode. Conditions of transitioning between the back-and-forth moving mode and the transverse moving mode will be explained below in detail.

Figure 14:
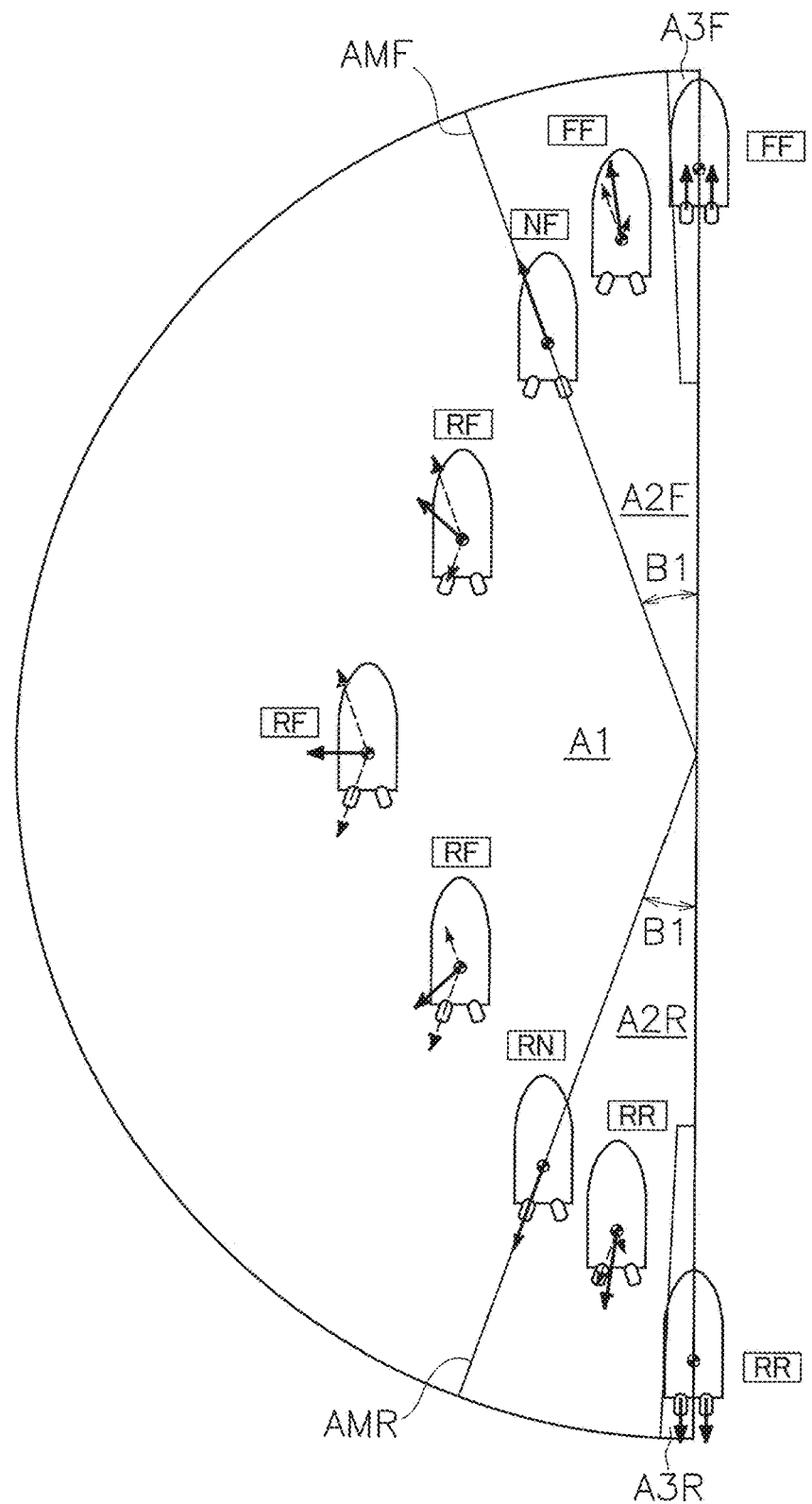
FIG. 14 is a diagram showing moving directions of the vessel and shift states of the right and left propulsion devices in accordance with tilt directions of the joystick.

The transverse moving mode, which is used when the joystick 32 is tilted in right-related directions, has been explained above. In the transverse moving mode used when the joystick 32 is tilted in left-related directions, the above-described control for the left propulsion device 3a and that for the right propulsion device 3b are reversed. FIG. 14 shows moving directions of the vessel 1 and shift states of the left and right propulsion devices 3a and 3b when tilting the joystick 32 in front, rear, left, left front, and left rear directions.

When the tilt direction of the joystick 32 is within the first range A1, the controller 33 sets the left propulsion device 3a to the rearward moving state and sets the right propulsion device 3b to the forward moving state. When the tilt direction of the joystick 32 is the left direction, the controller 33 sets the magnitude of the propulsive force PL of the left propulsion device 3a and that of the propulsive force PR of the right propulsion device 3b to be equal. Accordingly, the net force P is oriented in the left direction.

When the tilt direction of the joystick 32 is the left front direction within the first range A1, the controller 33 sets the magnitude of the propulsive force PR of the right propulsion device 3b to be greater than that of the propulsive force PL of the left propulsion device 3a. Accordingly, the net force P is oriented in the left front direction.

When the tilt direction of the joystick 32 is within the intermediate range AMF, the controller 33 sets the left propulsion device 3a to the neutral state and sets the right propulsion device 3b to the forward moving state. Accordingly, the net force P is oriented in the steering angle direction of the right propulsion device 3b. When the tilt direction of the joystick 32 is within the second range A2F, the controller 33 sets both the left and right propulsion devices 3a and 3b to the forward moving state. Moreover, the controller 33 sets the magnitude of the propulsive force PR of the right propulsion device 3b to be greater than that of the propulsive force PL of the left propulsion device 3a. Accordingly, the net force P is oriented in the left front direction.

When the tilt direction of the joystick 32 is the left rear direction within the first range A1, the controller 33 sets the magnitude of the propulsive force PL of the left propulsion device 3a to be greater than that of the propulsive force PR of the right propulsion device 3b. Accordingly, the net force P is oriented in the left rear direction.

When the tilt direction of the joystick 32 is within the intermediate range AMR, the controller 33 sets the left propulsion device 3a to the rearward moving state and sets the right propulsion device 3b to the neutral state. Accordingly, the net force P is oriented in the steering angle direction of the left propulsion device 3a. When the tilt direction of the joystick 32 is within the second range A2R, the controller 33 sets both the left and right propulsion devices 3a and 3b to the rearward moving state. Moreover, the controller 33 sets the magnitude of the propulsive force PL of the left propulsion device 3a to be greater than that of the propulsive force PR of the right propulsion device 3b. Accordingly, the net force P is oriented in the left rear direction.

Figure 15:
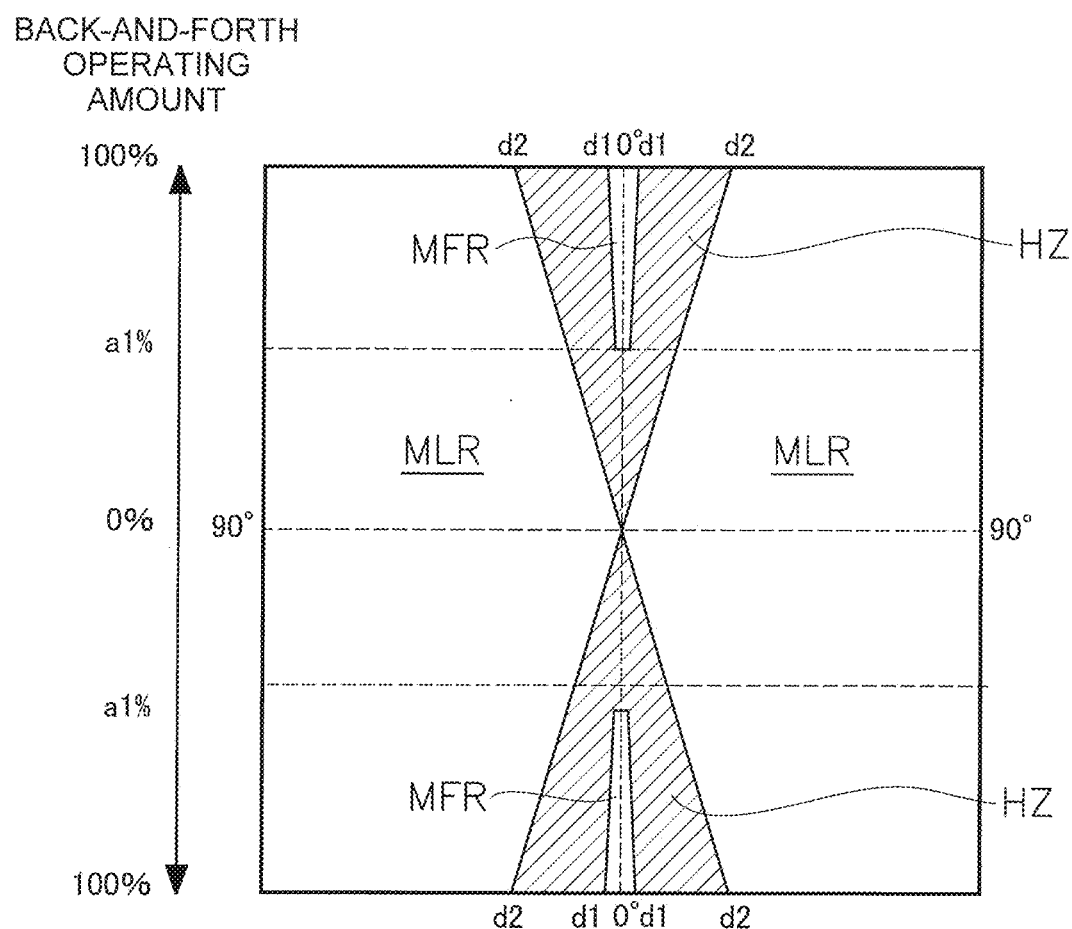
FIG. 15 is a diagram showing conditions of transitioning between a back-and-forth moving mode and a transverse moving mode.

FIG. 15 is a diagram showing conditions of transitioning between the back-and-forth moving mode and the transverse moving mode. In FIG. 15, regarding the tilt direction of the joystick 32, 0 degrees means the back-and-forth direction whereas 90 degrees means the right-and-left direction. Additionally in FIG. 15, the operating amount of the joystick 32 is indicated by percentage. 0% means that the joystick 32 is not being operated and is set in the neutral position. 100% means that the operating amount of the joystick 32 is maximum. "MFR" indicates zones in which the back-and-forth moving mode is used. "MLR" indicates zones in which the transverse moving mode is used.

As shown in FIG. 15, a condition of transitioning from the transverse moving mode (MLR) to the back-and-forth moving mode (MFR) is that the tilt direction of the joystick 32 is less than or equal to a first threshold d1, and simultaneously, the operating amount of the joystick 32 is greater than a predetermined value al. The ranges, in which the tilt direction of the joystick 32 is less than or equal to the first threshold d1, are the third ranges A3F and A3R. Therefore, the condition of transitioning from the transverse moving mode (MLR) to the back-and-forth moving mode (MFR) is that the tilt direction of the joystick 32 is within any of the third ranges A3F and A3R, and simultaneously, the operating amount of the joystick 32 is greater than the predetermined value al.

On the other hand, a condition of transitioning from the back-and-forth moving mode (MFR) to the transverse moving mode (MLR) is that the tilt direction of the joystick 32 is greater than or equal to a second threshold d2. The second threshold d2 is greater than the first threshold d1. In other words, the second threshold d2 means a direction closer to the right-and-left direction than the first threshold d1. In FIG. 15, hatched ranges HZ indicate hysteresis zones.

In the vessel steering system 2 according to the preferred embodiments explained above, when the tilt direction of the joystick 32 is within the second range A2F, A2R closer to the back-and-forth direction than the first range A1, the steering angles of the left and right propulsion devices 3a and 3b are set such that the left and right propulsion devices 3a and 3b are oriented bilaterally opposite to each other such that each is slanted at the predetermined angle B1 with respect to the back-and-forth direction of the vessel 1. Additionally, both the left and right propulsion devices 3a and 3b are set to either the forward moving state or the rearward moving state. Moreover, the propulsive forces of the left and right propulsion devices 3a and 3b are controlled such that the net force P of the propulsive forces of the left and right propulsion devices 3a and 3b is oriented in a direction corresponding to the tilt direction of the joystick 32. Because of this, the net force P acts in a direction closer to either the front direction or the rear direction than the steering angle of the left (right) propulsion device 3a (3b). Accordingly, the vessel 1 is moved by operating the joystick 32 to a zone closer to either the front direction or the rear direction than the steering angle direction of the left (right) propulsion device 3a (3b). Therefore, a zone to which the vessel 1 is movable is expanded in the transverse moving mode using the joystick 32.

When the tilt direction of the joystick 32, within the second range A2F, is changed to be within the third range A3F, only the steering angles of the left and right propulsion devices 3a and 3b are changed, while both the left and right propulsion devices 3a and 3b are kept in the forward moving state. Therefore, occurrence of shock is significantly reduced or prevented than when one of the left and right propulsion devices 3a and 3b is switched from the rearward moving state to the forward moving state.

Preferred embodiments of the present invention have been explained above. However, the present invention is not limited to the above-described preferred embodiments, and a variety of changes can be made without departing from the gist of the present invention.

The number of propulsion devices is not limited to two, and may be three or greater. The propulsion devices are not limited to outboard motors, and may be another type of propulsion device such as inboard-outboard motors. The configuration of each propulsion device is not limited to that in the above-described preferred embodiments, and may be changed.

The controller 33 is not limited to a single device, and may include a plurality of controllers. The above-described processes executed in the back-and-forth moving mode and that executed in the transverse moving mode may be decentralized to and executed by the plurality of controllers. The above-described processes may be changed or omitted in part.

Each intermediate range AMF, AMR is not limited only to the steering angle direction of the left (right) propulsion device 3a (3b). Each intermediate range AMF, AMR may be a wider range of directions including the steering angle direction of the left (right) propulsion device 3a (3b).

Figure 16:
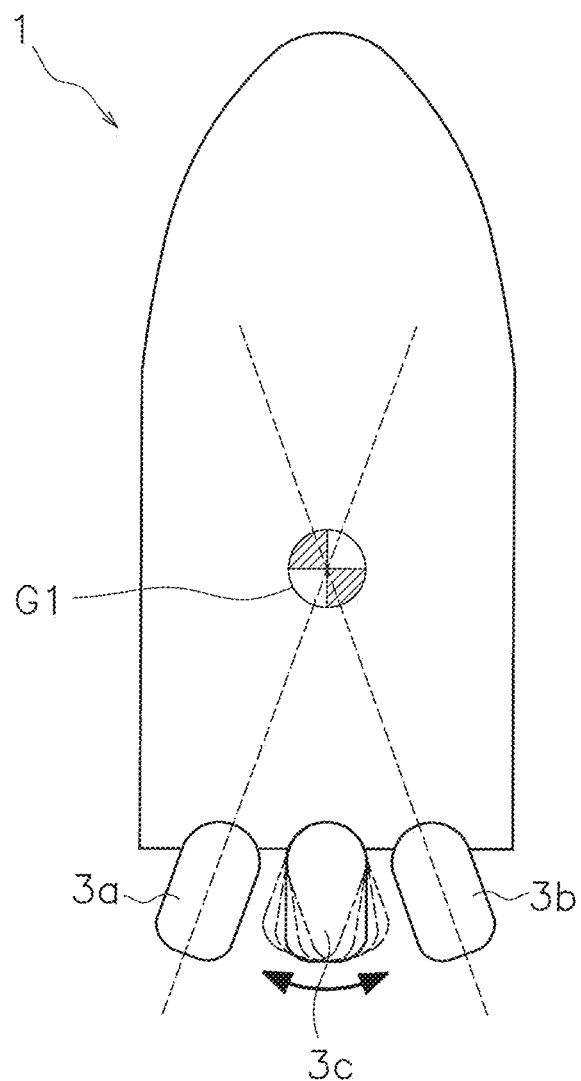
FIG. 16 is a top view of a vessel according to a modified preferred embodiment of the present invention.
Figure 17:
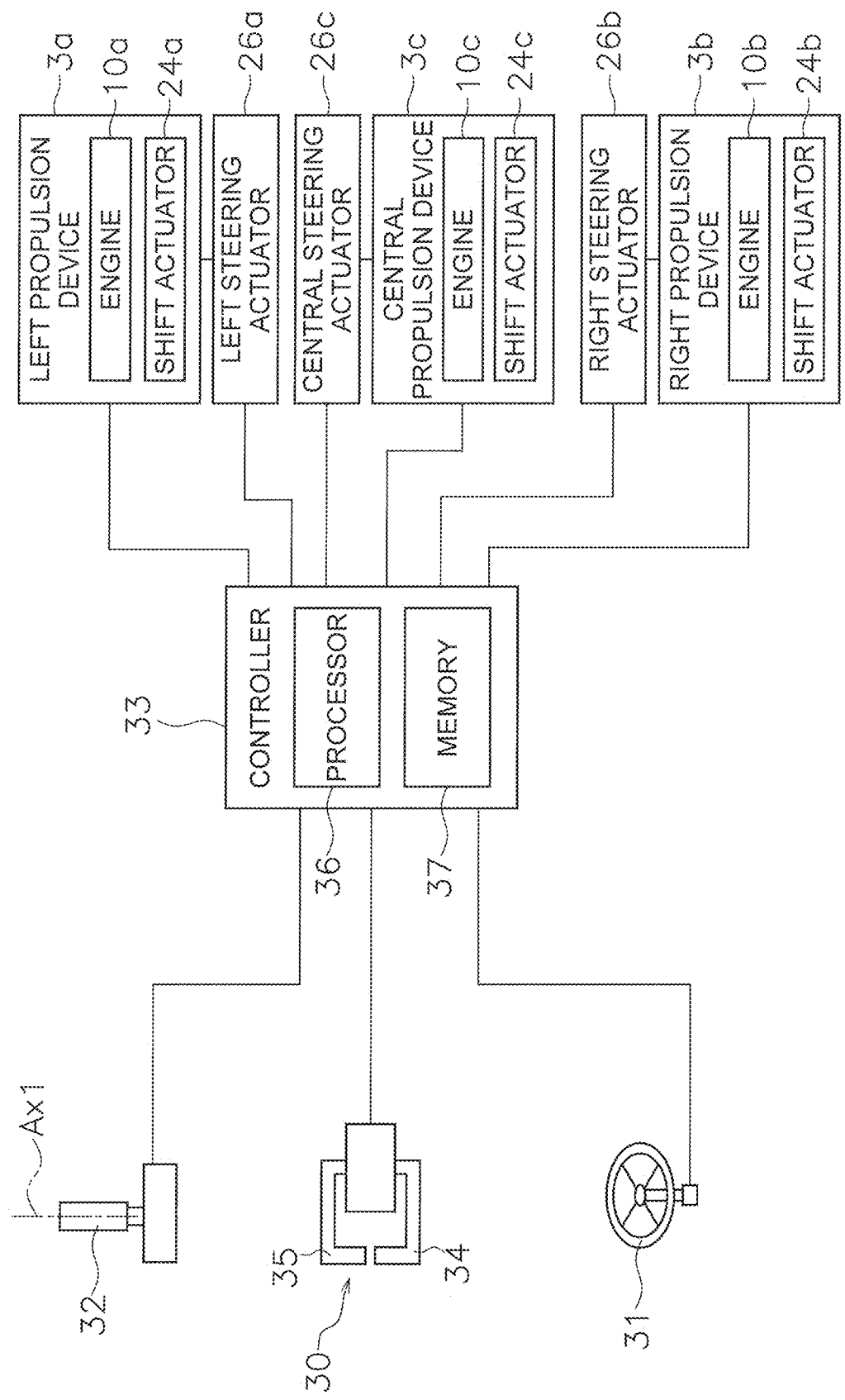
FIG. 17 is a schematic diagram showing a configuration of a vessel steering system according to the modified preferred embodiment of the present invention.
Figure 18:
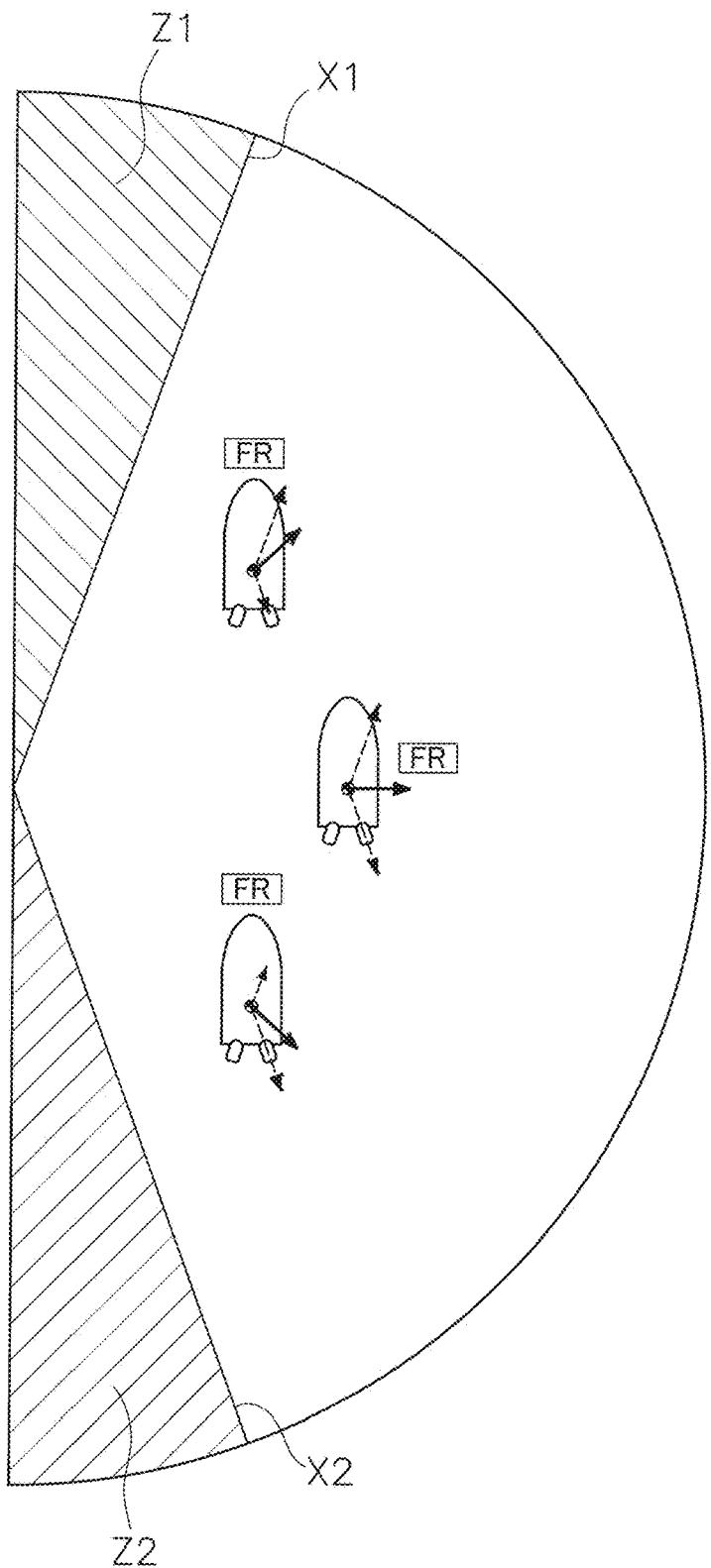
FIG. 18 is a diagram showing a zone to which a vessel is movable using a vessel steering system according to a prior art.

FIG. 16 is a top view of the vessel 1 in which the vessel steering system 2 according to a modified preferred embodiment is installed. FIG. 17 is a schematic diagram showing a configuration of the vessel steering system 2 according to the modified preferred embodiment. As shown in FIGS. 16 and 17, the vessel steering system 2 further includes a central propulsion device 3c and a central steering actuator 26c. The central propulsion device 3c is disposed between the left propulsion device 3a and the right propulsion device 3b.

The central propulsion device 3c has a similar configuration to the left and right propulsion devices 3a and 3b described above. For example, the central propulsion device 3c includes an engine 10c and a shift actuator 24c. The engine 10c and the shift actuator 24c have similar configurations to the engine 10a and the shift actuator 24a described above, respectively.

The central steering actuator 26c is connected to the central propulsion device 3c to change the steering angle of the central propulsion device 3c. The central steering actuator 26c has a similar configuration to the left and right steering actuators 26a and 26b described above.

In the vessel steering system 2 according to the modified preferred embodiment, when the tilt direction of the joystick 32 is within any of the second ranges A2F and A2R, the controller 33 sets the steering angle of the central propulsion device 3c such that the central propulsion device 3c is oriented in a direction corresponding to the tilt direction of the joystick 32. Additionally, the controller 33 changes the steering angle of the central propulsion device 3c in accordance with a change in the tilt direction of the joystick 32. Accordingly, the vessel 1 is moved in a direction corresponding to the tilt direction of the joystick 32.

In the vessel steering system 2 according to the modified preferred embodiment, for instance, when the tilt direction of the joystick 32 is changed from the right rear direction to the left rear direction via the straight rear direction, the steering angle of the central propulsion device 3c is changed in accordance with the tilt direction of the joystick 32. Because of this, a change in steering angle of the central propulsion device 3c is smaller than when the steering angle of the central propulsion device 3c is changed from the same steering angle as the right propulsion device 3b to the same steering angle as the left propulsion device 3a at the moment that the tilt direction of the joystick 32 moves across the straight rear direction. Accordingly, the occurrence of shock is significantly reduced or prevented.

According to preferred embodiments of the present invention, a zone to which a vessel is movable is expanded in a transverse moving mode using a joystick.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for steering a vessel comprising:
   a left propulsion device;
   a left actuator connected to the left propulsion device to change a steering angle of the left propulsion device;
   a right propulsion device;
   a right actuator connected to the right propulsion device to change a steering angle of the right propulsion device;
   a joystick operable in a tiltable manner; and
   a controller configured or programmed to receive a signal indicating a tilt direction of the joystick and to control the steering angle and a propulsive force of the left propulsion device and the steering angle and a propulsive force of the right propulsion device; wherein
   the controller is configured or programmed to:
      when the tilt direction of the joystick is within a first range including a straight transverse direction, set the steering angles of the right and left propulsion devices such that the right and left propulsion devices are oriented bilaterally opposite to each other such that each is slanted at a predetermined angle with respect to a back-and-forth direction of the vessel, set one of the right and left propulsion devices to a forward moving state and set the other of the right and left propulsion devices to a rearward moving state, and control the propulsive forces of the right and left propulsion devices such that a net force of the propulsive forces of the right and left propulsion devices is oriented in a direction corresponding to the tilt direction of the joystick; and
      when the tilt direction of the joystick is within a second range closer to the back-and-forth direction than the first range, set the steering angles of the right and left propulsion devices such that the right and left propulsion devices are oriented bilaterally opposite to each other such that each is slanted at the predetermined angle with respect to the back-and-forth direction, set both the right and left propulsion devices to either the forward moving state or the rearward moving state, and control the propulsive forces of the right and left propulsion devices such that the net force of the propulsive forces of the right and left propulsion devices is oriented in the direction corresponding to the tilt direction of the joystick.

2. The system for steering the vessel according to claim 1, wherein the second range includes a range closer to the back-and-forth direction than the predetermined angle.

3. The system for steering the vessel according to claim 1, wherein the controller is configured or programmed to:
   when the tilt direction of the joystick is within an intermediate range between the first range and the second range, set the steering angles of the right and left propulsion devices such that the right and left propulsion devices are oriented bilaterally opposite to each other such that each is slanted at the predetermined angle with respect to the back-and-forth direction, and set one of the right and left propulsion devices to either the forward moving state or the rearward moving state and set the other of the right and left propulsion devices to a neutral state.

4. The system for steering the vessel according to claim 1, wherein the controller is configured or programmed to:
   when the tilt direction of the joystick is within a third range that is closer to the back-and-forth direction than the second range and includes the back-and-forth direction, set the steering angles of the right and left propulsion devices such that the right and left propulsion devices are oriented along the back-and-forth direction of the vessel, and set both the right and left propulsion devices to either the forward moving state or the rearward moving state.

5. The system for steering the vessel according to claim 1, wherein the controller is configured or programmed to:
   when the tilt direction of the joystick is within a third range that is closer to the back-and-forth direction than the second range and includes the back-and-forth direction and an operating amount of the joystick tilted in the back-and-forth direction is less than or equal to a predetermined value, set the steering angles of the right and left propulsion devices such that the right and left propulsion devices are oriented bilaterally opposite to each other such that each is slanted at the predetermined angle with respect to the back-and-forth direction, set both the right and left propulsion devices to either the forward moving state or the rearward moving state, and control the propulsive forces of the right and left propulsion devices such that the net force of the propulsive forces of the right and left propulsion devices is oriented in the direction corresponding to the tilt direction of the joystick; and
   when the tilt direction of the joystick is in the third range and the operating amount of the joystick tilted in the back-and-forth direction is greater than the predetermined value, set the steering angles of the right and left propulsion devices such that the right and left propulsion devices are oriented along the back-and-forth direction of the vessel, and set both the right and left propulsion devices to either the forward moving state or the rearward moving state.

6. The system for steering the vessel according to claim 1, further comprising:
   a central propulsion device disposed between the right and left propulsion devices in a right-and-left direction of the vessel; and
   a central actuator connected to the central propulsion device to change a steering angle of the central propulsion device; wherein
   the controller is configured or programmed to:
      when the tilt direction of the joystick is within the second range, set the steering angle of the central propulsion device such that the central propulsion device is oriented in a direction corresponding to the tilt direction of the joystick, and change the steering angle of the central propulsion device with a change in the tilt direction of the joystick.

7. A method executed by a controller to steer a vessel including a right propulsion device and a left propulsion device, the method comprising:
   receiving a signal indicating a tilt direction of a joystick to steer the vessel;
   when the tilt direction of the joystick is within a first range including a straight transverse direction:

setting a steering angle of the right propulsion device and a steering angle of the left propulsion device such that the right and left propulsion devices are oriented bilaterally opposite to each other such that each is slanted at a predetermined angle with respect to a back-and-forth direction of the vessel;

setting one of the right and left propulsion devices to a forward moving state and the other of the right and left propulsion devices to a rearward moving state; and controlling a propulsive force of the right propulsion device and a propulsive force of the left propulsion device such that a net force of the propulsive forces of the right and left propulsion devices is oriented in a direction corresponding to the tilt direction of the joystick; and when the tilt direction of the joystick is within a second range closer to the back-and-forth direction than the first range:

setting the steering angles of the right and left propulsion devices such that the right and left propulsion devices are oriented bilaterally opposite to each other such that each is slanted at the predetermined angle with respect to the back-and-forth direction;

setting both the right and left propulsion devices to either the forward moving state or the rearward moving state; and controlling the propulsive forces of the right and left propulsion devices such that the net force of the propulsive forces of the right and left propulsion devices is oriented in the direction corresponding to the tilt direction of the joystick.

8. The method according to claim 7, wherein the second range includes a range closer to the back-and-forth direction than the predetermined angle.

9. The method according to claim 7, further comprising:
when the tilt direction of the joystick is within an intermediate range between the first range and the second range:

setting the steering angles of the right and left propulsion devices such that the right and left propulsion devices are oriented bilaterally opposite to each other such that each is slanted at the predetermined angle with respect to the back-and-forth direction; and setting one of the right and left propulsion devices to either the forward moving state or the rearward moving state and the other of the right and left propulsion devices to a neutral state.

10. The method according to claim 7, further comprising:
when the tilt direction of the joystick is within a third range that is closer to the back-and-forth direction than the second range and includes the back-and-forth direction:

setting the steering angles of the right and left propulsion devices such that the right and left propulsion devices are oriented along the back-and-forth direction of the vessel; and setting both the right and left propulsion devices to either the forward moving state or the rearward moving state.

11. The method according to claim 7, further comprising:
when the tilt direction of the joystick is within a third range that is closer to the back-and-forth direction than the second range and includes the back-and-forth direction and an operating amount of the joystick tilted in the back-and-forth direction is less than or equal to a predetermined value:

setting the steering angles of the right and left propulsion devices such that the right and left propulsion devices are oriented bilaterally opposite to each other such that each is slanted at the predetermined angle with respect to the back-and-forth direction;

setting both the right and left propulsion devices to either the forward moving state or the rearward moving state; and controlling the propulsive forces of the right and left propulsion devices such that the net force of the propulsive forces of the right and left propulsion devices is oriented in the direction corresponding to the tilt direction of the joystick; and when the tilt direction of the joystick is in the third range and the operating amount of the joystick tilted in the back-and-forth direction is greater than the predetermined value:

setting the steering angles of the right and left propulsion devices such that the right and left propulsion devices are oriented along the back-and-forth direction of the vessel; and setting both the right and left propulsion devices to either the forward moving state or the rearward moving state.

12. The method according to claim 7, wherein the vessel further includes a central propulsion device disposed between the right and left propulsion devices in a right-and-left direction of the vessel, and the method further comprises:

when the tilt direction of the joystick is in the second range:

setting a steering angle of the central propulsion device such that the central propulsion device is oriented in a direction corresponding to the tilt direction of the joystick; and changing the steering angle of the central propulsion device with a change in the tilt direction of the joystick.

* * * * *